United States Patent [19]

Matsumoto et al.

[11] 4,240,137

[45] Dec. 16, 1980

[54] COMPUTER FOR DIRECTLY EXECUTING A PROGRAM INCLUDING A PLURALITY OF STRUCTURED BLOCKS

[75] Inventors: Yoshihiro Matsumoto; Hajime Kurii, both of Tokyo, Japan

[73] Assignee: Tokyo Shibaura Denki Kabushiki Kaisha, Kanagawa, Japan

[21] Appl. No.: 919,297

[22] Filed: Jun. 26, 1978

[30] Foreign Application Priority Data

Feb. 13, 1978 [JP] Japan ............................. 53/14141

[51] Int. Cl.³ .............................................. G06F 9/40
[52] U.S. Cl. ...................................... 364/200; 364/900
[58] Field of Search ... 364/200 MS File, 900 MS File

[56] References Cited

U.S. PATENT DOCUMENTS

| | | | |
|---|---|---|---|
| 3,614,740 | 10/1971 | Delagi et al. | 364/200 |
| 3,614,741 | 10/1971 | McFarland et al. | 364/200 |
| 3,646,522 | 2/1972 | Furman et al. | 364/200 |
| 3,735,363 | 5/1973 | Beers et al. | 364/200 |
| 3,938,098 | 10/1976 | Garlic | 364/200 |
| 4,050,058 | 9/1977 | Garlic | 364/200 |

OTHER PUBLICATIONS

J. R. Mick, "Microprogramming a Bipolar Microprocessor", Advanced Micro Devices, Inc., Microprogramming Handbook, 1976, pp. 1-1 thru 1-7.
"Preliminary Data", AM 2930 Program Control Unit Advanced Micro Devices, Bipolar Microprocessor Circuits, Catalogue Advanced Micro Devices Inc, 2/77.
Herman-Giddens et al., "BIOMAC:Block Structured Programming Using PDP-11 Assembler Language", Software-Practice and Experience, vol. 5, 359-374, 1975.

*Primary Examiner*—Harvey E. Springborn
*Attorney, Agent, or Firm*—Stevens, Davis, Miller & Mosher

[57] ABSTRACT

A computer which executes a program made up of a plurality of blocks comprises a program counter which designates an address of an instruction to be executed, first and second registers that stores entry addresses of first and second blocks respectively of the program, and a push down stack that stores an entry address of a third block of the program. The instruction designated by the program counter causes the reading out of data from a main memory device so as to read out the contents of one of the first, second or third blocks of the program from the main memory device for execution. The designated instruction causes the reading of one of the entry addresses stored in the first and second registers or the push down stack so as to load such entry address into the program counter to cause the readout of the program block. The entry address stored in the push down stack is selectively discarded when it is indicated to be of no future use by an instruction in the program portion contained in the said block that is being executed.

9 Claims, 10 Drawing Figures

F I G. 2
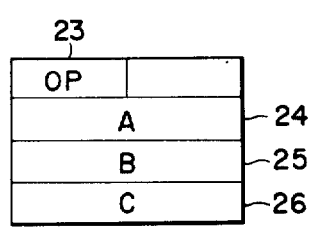
F I G. 3
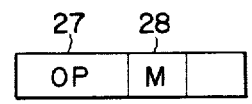
F I G. 4
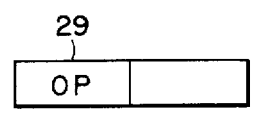
F I G. 5
(a)
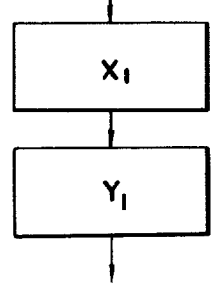
(b)
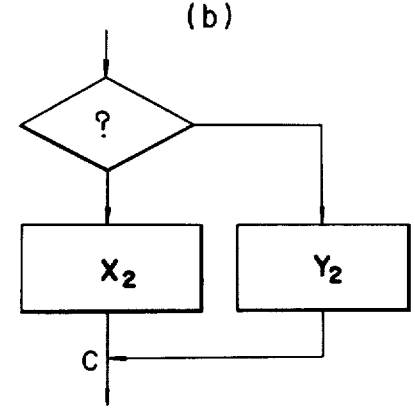
(c)
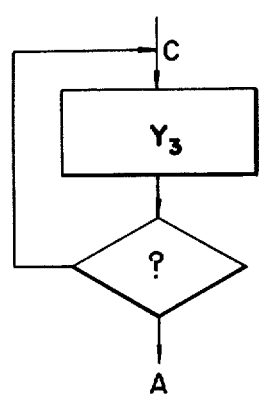
(d)
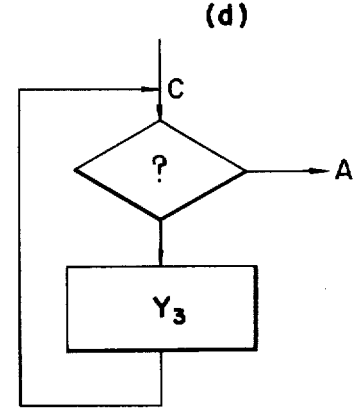

FIG. 9
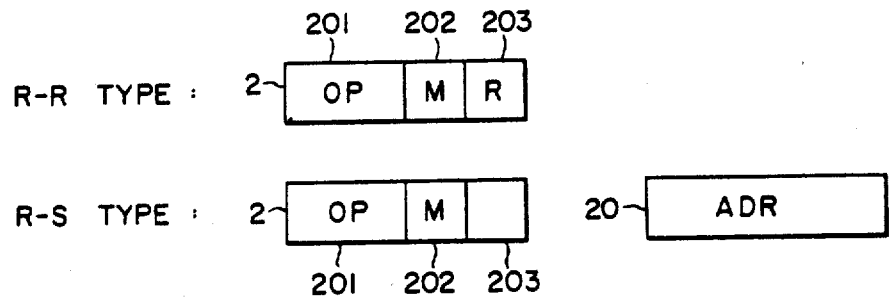
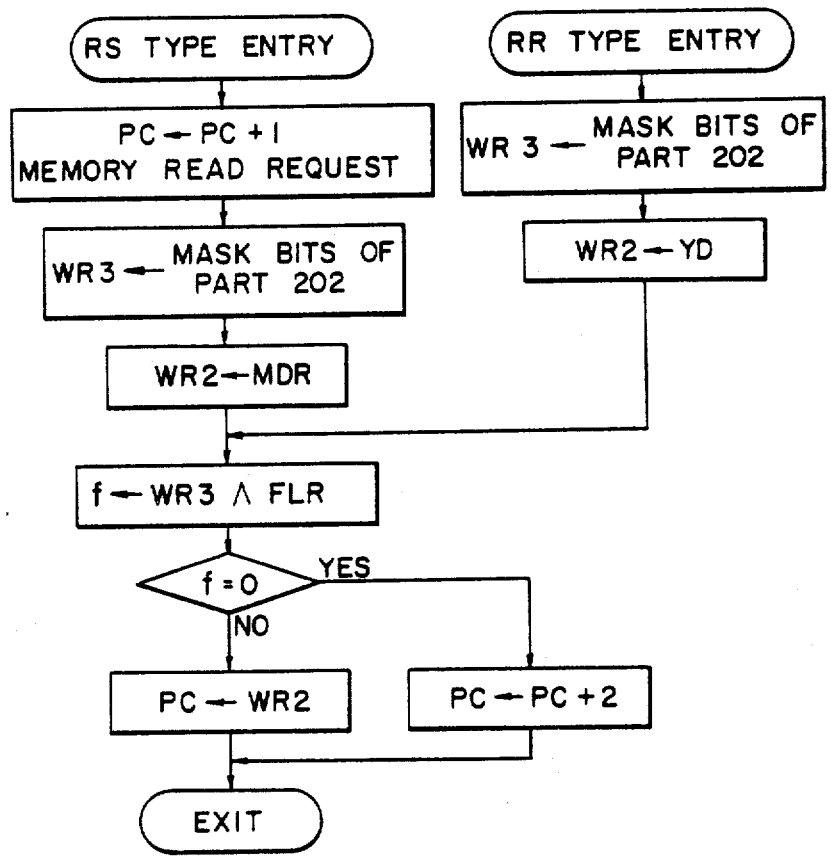

COMPUTER FOR DIRECTLY EXECUTING A PROGRAM INCLUDING A PLURALITY OF STRUCTURED BLOCKS

BACKGROUND OF THE INVENTION

This invention relates to a central processing unit of a computer suitable for use in structured programming.

In recent years, so-called structured programming has been used for the purpose of improving the productivity of software. Heretofore, however, how to increase the efficiency of execution of a program has been considered from the standpoint of programming technique and only a limited effort has been made to improve a central processing unit for executing structured programming and which is capable of readily preparing a program written with assembler language in a structured configuration where a plurality of blocks are assembled in a tree like structure. In this specification, the term "block" is used to mean an assembly of a minimum number of instructions and data that performs certain function and comprises one or more instructions, and the term "program" to mean an assembly of one or more blocks providing certain performance. Especially, in a computer, such as a micro-processor which is not provided with a suitable compiler enabling structured programming, the programmer must directly convert machine instructions into code by using an assembler. Therefore, it is desired to provide a novel central processing unit utilizing machine instructions for preparing structured programs.

SUMMARY OF THE INVENTION

It is an object of this invention to provide a novel central processing unit capable of preventing the use of a "GO TO" instruction when preparing a program making it possible to avoid non-structured programs which are liable to produce errors.

A further object of this invention is to provide a novel central processing unit capable of executing blocked program in which the program is constituted by a plurality of blocks and in which each block can be subdivided into a number of smaller blocks.

Generally speaking, according to the invention there is provided a computer for directly executing a program including a plurality of structured blocks comprising a main memory device for storing a program including a plurality of structured blocks, a program counter for designating the address of an instruction to be executed, a first register for storing an entry address of a first block of the program, a second register for storing an entry address of a second block of the program, a push down stack for storing an entry address of a third block of the program; circuitry for causing the program counter to designate an address for reading data from the main memory device thereby reading out from the main memory device the the entry addresses the first, second and third blocks of the program; circuitry for producing an instruction to store the read out entry addresses in the first and second registers and in the push down stack respectively; circuitry for popping up the push down stack and for storing the content thereof in the program counter; and circuitry for producing an instruction from the program for popping up the push down stack and for discarding data derived out therefrom.

BRIEF DESCRIPTION OF THE DRAWINGS

FIG. 2 is a diagram showing the format of a ML instruction according to this invention;

FIG. 3 shows the format of a branch when a truth condition is established (BTC instruction) and the format of a branch when a false condition is established (BFC instruction), these instructions being called truth-/false check instructions.

FIG. 4 is a diagram showing a format representing an END instruction and a LOOP OUT instruction utilized in this invention;

FIGS. 5a, 5b 5c and 5d are flow charts showing basic three types of the program flow in the structured blocks of the program, FIG. 9 shows two types of the truth/false check instructions and a flow chart for explaining how to execute these instructions.

DESCRIPTION OF THE PREFERRED EMBODIMENT

Figure 1A:
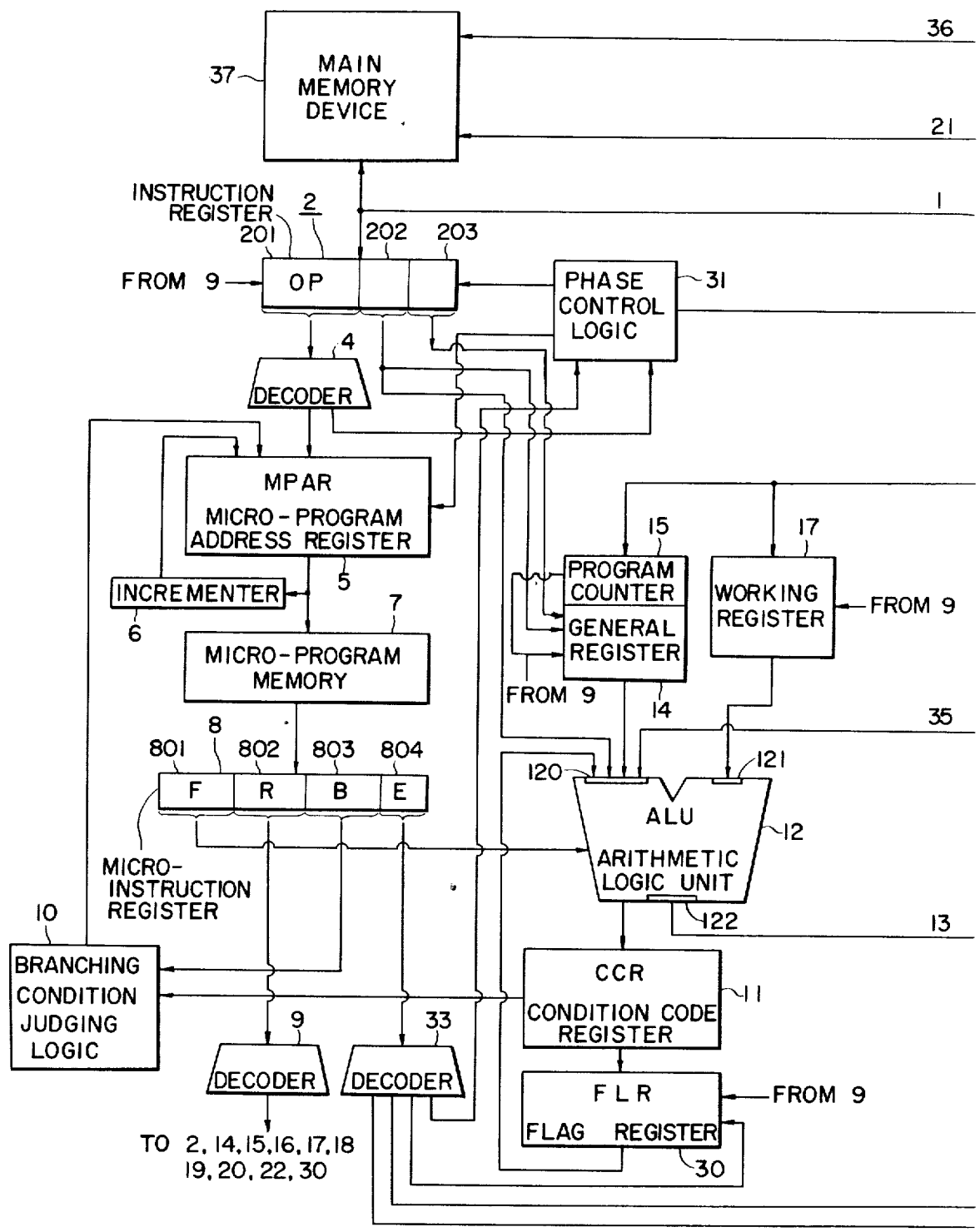
FIGS. 1A and 1B, when combined, represent a block diagram showing one embodiment of the central processing unit embodying the invention.
Figure 1B:
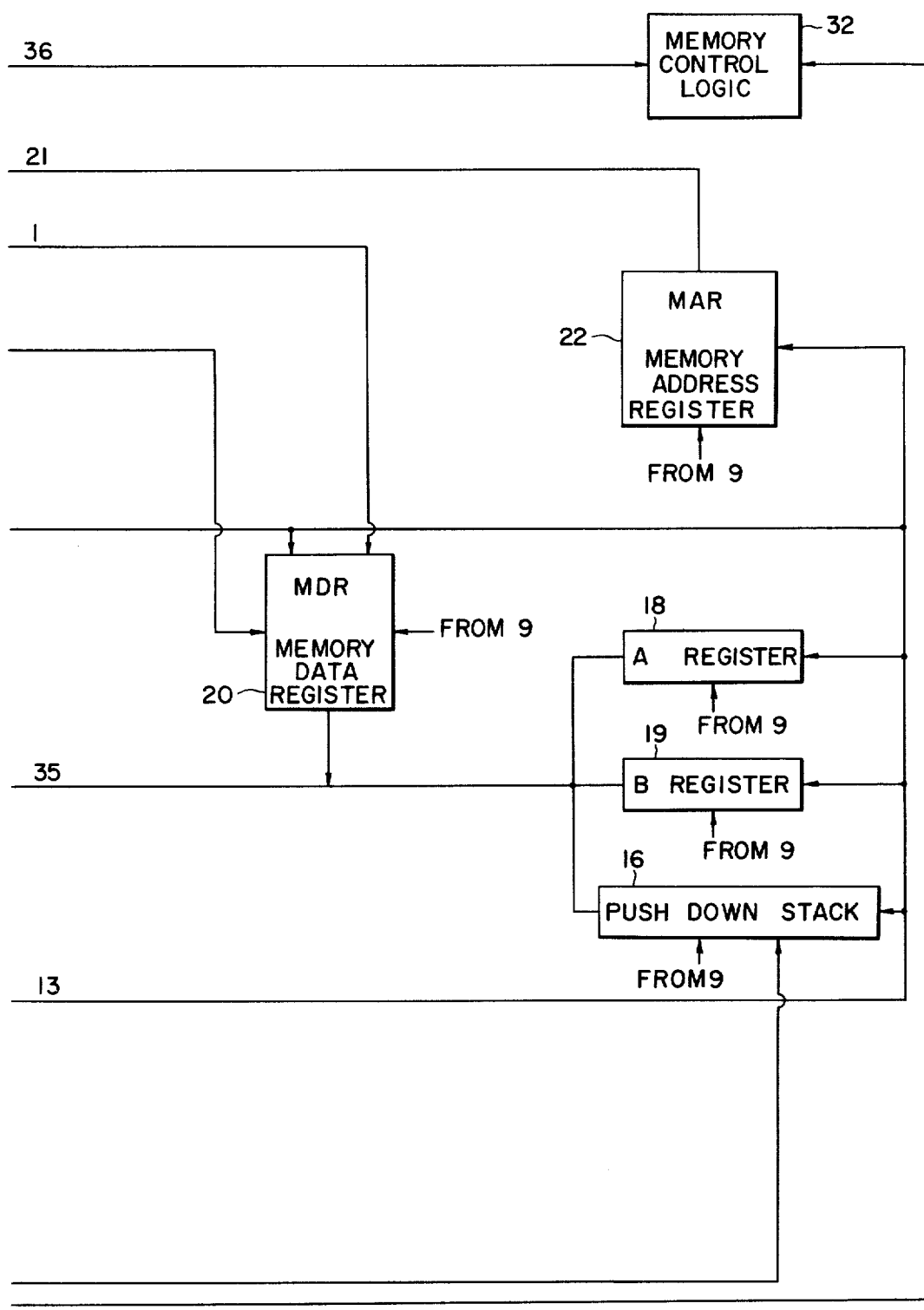

FIGS. 1A and 1B represent a block diagram showing one embodiment of the central processing unit as applied to a computer of the micro-program control type wherein a multiple load (ML) instruction, a truth/false check instruction, a LOOP OUT instruction and an END instruction (which will be defined later) are given by a micro-program.

In the embodiment shown in FIGS. 1A and 1B instructions to be executed consecutively are derived from a main memory device 37 and loaded in an instruction register 2 through a memory bus line 1. The address of the instruction to be loaded is designated by a program counter 15. A general register 14 comprises a plurality of register stages and any desired stage can be designated by a portion 202 of the instruction register 2. A decoder 4 is provided for producing the entry address of the micro-program necessary to execute the instruction in response to an operation code 201 which is a part of the instruction loaded in instruction register 2. A micro-program address register 5 (MPAR) latches the leading address and designates it to a micro-program memory device 7 (MPM). The content of MPM 7 corresponding to MPAR 5 is latched in a micro-instruction register 8 (MIR).

MIR 8 comprises a function designation part 801 for designating the type of the operation of an arithmetic logic unit 12, a register designation part 802 for designating a register that stores the data utilized in the arithmetic operation or the result thereof, an address designation part 803 utilized to designate a branch address branching mask bits, and a part 804 adapted to control other gate circuits.

More particularly, part 801 of MIR 8 controls the arithmetic logic unit 12. The codes loaded in this part include any one of INCREMENT (INCR), LOAD (L), LOGICAL PRODUCT (N) and BRANCH (B).

The code INCR adds one to the value of one input port 120 of arithmetic logic unit 12 and the result of addition is sent out on an internal bus line 13. The code L operates to send out to the internal bus line the value of either one of input ports 120 and 121 of the arithmetic logic unit without any change. The code N operates to produce a logical product of the two values at two input ports 120 and 121 and to send out the result to the internal bus line. The code B instructs "NO OPERATION" to the arithmetic logic unit. When supplied with the NO OPERATION instruction the arithmetic logic unit performs no logical operation so that the value of a condition code register (CCR) 11 which is determined by the result of operation would also not be changed. Under this condition, part 803 of MIR 8 operates as will be described later. The code of a part 801 of MIR 8 may be summarized as shown in the following Table I.

TABLE I

| Bit 0–3 | Symbol | Function |
|---|---|---|
| 0001 | B | "NO OPERATION" to the arithmetic logic unit 12. |
| 0010 | L | Send out to the internal bus line 13 the value of either one of input ports 120 and 121 of the arithmetic logic unit 12. |
| 1010 | N | Logical product of two values at two input ports 120 and 121 of the arithmetic logic unit 12. |
| 1100 | INCR | Add one to the value of one input port 120 of the arithmetic logic unit 12. |

Part 802 of MIR 8 designates the registers to be loaded in the input ports 120 and 121 of the arithmetic logic unit 12. Registers designated at this time includes part 202 of instruction register 2, either one of the register stages of general register 14 designated by part 202 of instruction register 2, either one of the stages of general register 14 designated by part 203 of the instruction register 2, either one of program counter 15, a push down stack 16, and a working register 17, a A register 18, a B register 19, a memory data register (MDR) 20, a memory address register (MAR) 22, and a flag register (FLR) 30.

Figure 7:
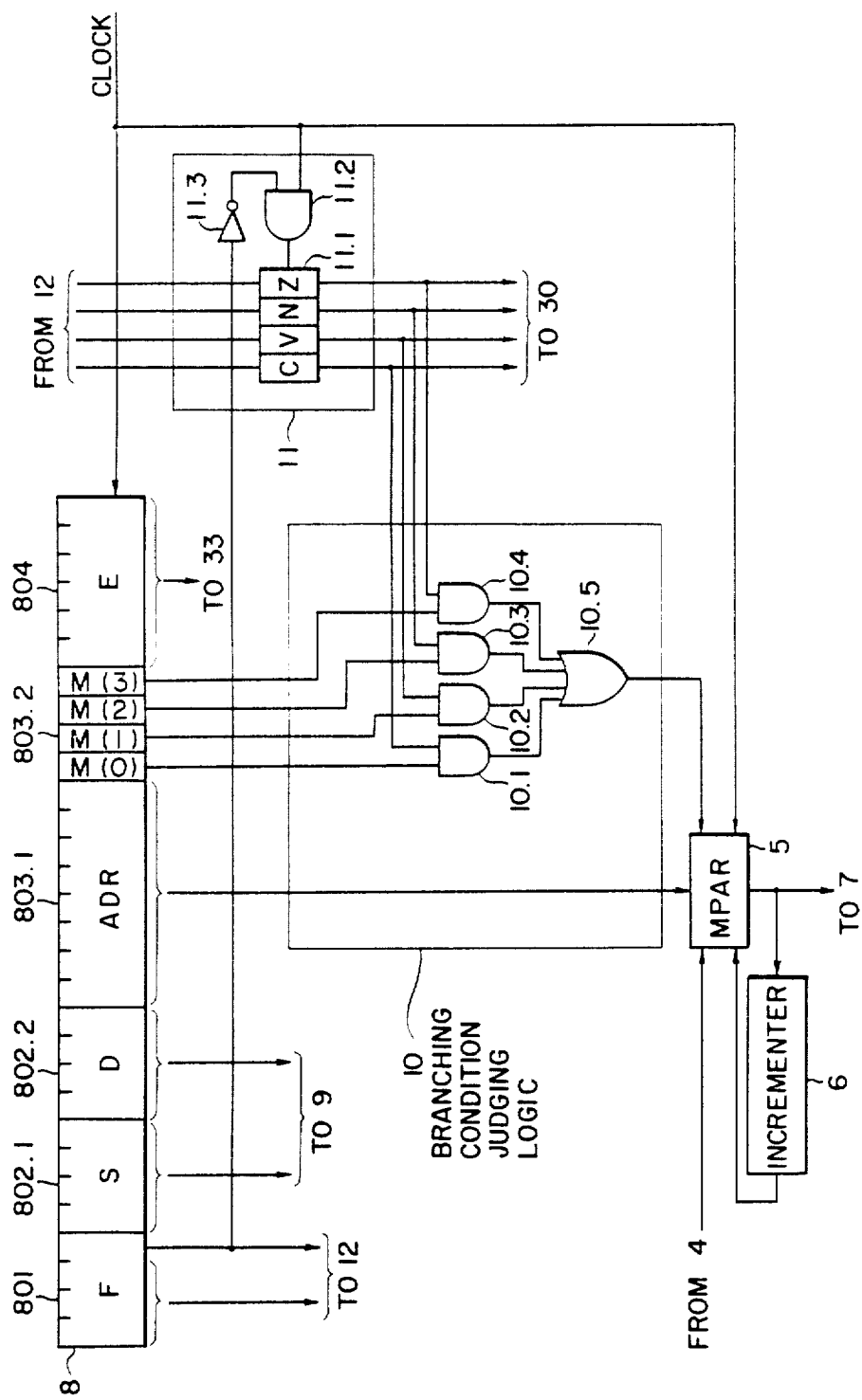
FIG. 7 is a block diagram showing the detail of a microinstruction register, a condition code register and a branching condition judging logic shown in FIG. 1A

The part 802 is subdivided into two subparts, as shown in FIG. 7. One subpart 802.1 designates the destination registers. The value produced by the arithmetic logic unit 12 is loaded into one of these registers. The other subpart 802.2 designates the source registers. The content of a register designated by this subpart is loaded into the input port 120 or 121 of the arithmetic logic unit 12. The codes of parts 802.1 and 802.2 are shown in the following Table II.

TABLE II

| Bit 4–7 | Symbol | Source of Register |
|---|---|---|
| 0000 | YS | General register 14 designated by the part 202 of instruction register 2. |
| 0001 | YD | General register 14 designated by part 202 of instruction register 2. |
| 0010 | IR4 | Part 202 of instruction register 2. |
| 0011 | AR | A register 18 |
| 0100 | BR | B register 19 |
| 0101 | STK | Push down stack 16 |
| 0110 | MDR | Memory data register 20 |
| 0111 | WR0 | Working register 0 |
| 0000 | WR1 | Working register 1 |
| 1001 | WR2 | Working register 2 |
| 1010 | WR3 | Working register 3 |
| 1011 | FLR | Flag register |
| 1100 | — | |
| 1101 | — | |
| 1110 | — | |

TABLE II-continued

| Bit 4–7 | Symbol | Source of Register |
|---|---|---|
| 1111 | PC | Program counter |

Decoder 9 decodes codes supplied from part 802 of micro-instruction register 8 to produce control signals which are applied to output enabling terminals of registers 2, general register 14, program counter 15, push down stack 16, working register 17, A register 18, B register 19, memory data register 20, and flag register 30 as diagrammatically shown in FIGS. 1A and 1B. When the control signals become active, output gate circuits (not shown) of respective registers and push down stack are opened to send out the contents thereof.

Part 802 of micro-instruction register 8 designates a register that is holding the result operated by arithmetic logic unit 12.

Where it is necessary to hold the data of a given register, the control signals produced by decoder 9 are caused to vary so as to satisfy the AND condition of the clock signal applied to a computer whereby the data will be latched in the given register. The registers utilized for this purpose include a memory address register (MAR) 22 in addition to various registers described above.

Figure 8:
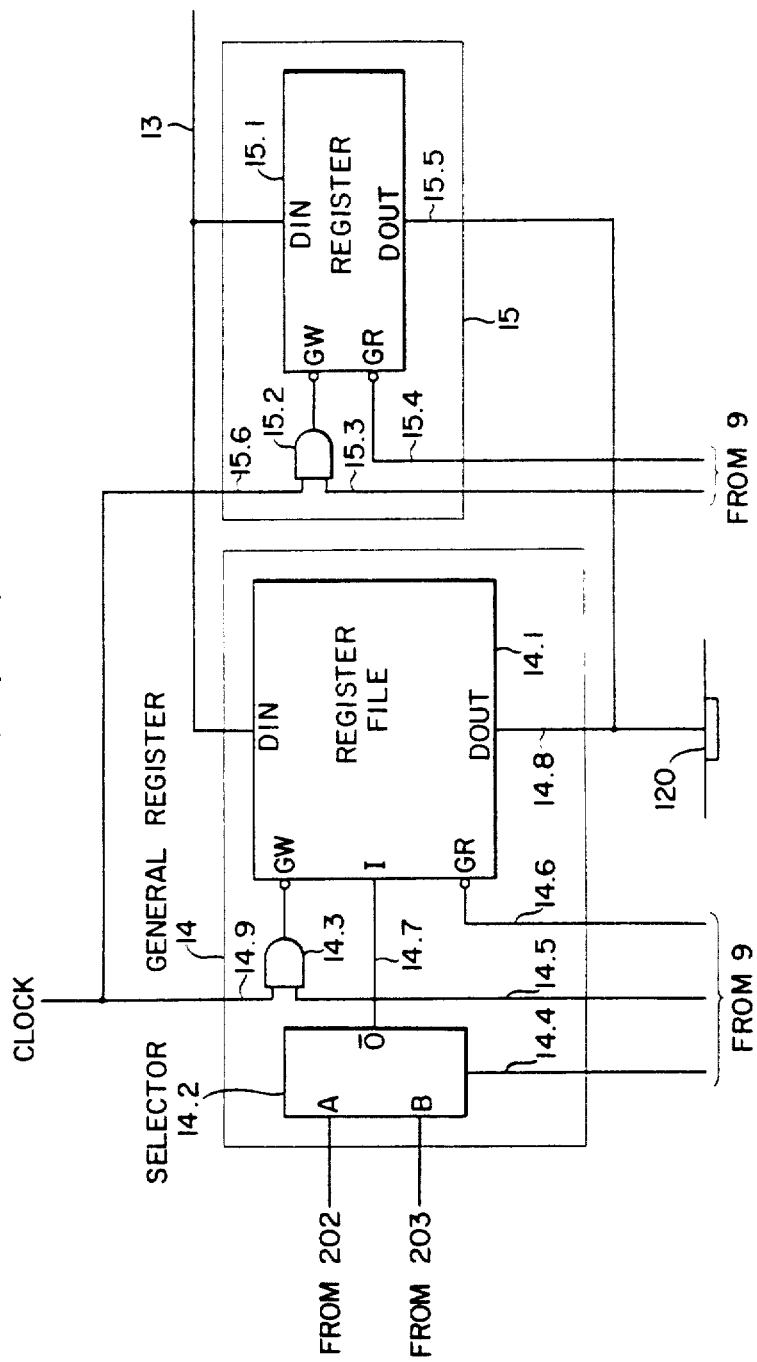
FIG. 8 is a block diagram showing the detail of a general register, a program counter shown in FIG. 1A

The detail of the general register 14 and the program counter 15 is shown in FIG. 8 and they operate as follows.

The general register 14 comprises a register file 14.1 constituted by 16 registers, a selector 14.2 which switches two inputs from two parts 202 and 203 of the instruction register 2 for selecting one of the registers of the register file 14.1 and a write control gate circuit 14.3.

Data writing operation into the general register 14 is performed as follows. A specific one of the 16 registers of the register file 14.1 to be written is designated by part 202 of the instruction register 2. The part 202 comprises 4 bits, so that it can designate any one of the 16 registers of the register file 14.1. When part 802.2 of the micro-instruction register 8 designates the general register 14 as a designation register, a designation signal 14.4 from decoder 9 is applied to selector 14.2 to cause it to select a signal from part 202 of the general register as a selection signal 14.7. At the same time, the decoder 9 supplies a write enabling signal 14.5 to the AND gate circuit 14.3. Under these conditions, the data calculated by the arithmetic logic unit 12 is sent to the register file 14.1 of the general register 14 via internal bus line 13.

The AND gate circuit 14.3 is enabled by a clock signal 14.9 and the write enabling signal to produce a write pulse which is used to write data into one of the register of the register file 14.1 designated by the selection signal 14.7.

The operation of reading out data from the general register 14 will now be described. A specific register of the register file 14.1 to be read out is designated by part 202 or 203 of the instruction register 2. The part 802.1 of the micro-instruction register 8 designates either one of parts 202 and 203 as a source register. Such designation is effected by applying a control signal 14.4 formed by decoder 9 to selector 14.2. When selected by the control signal 14.4, a signal applied to the selector 14.2 from part 202 or 203 is outputted as the selection signal 14.7. The outputs of the register file 14.1 have three-states and generally have a high impedance. When the read enabling signal 14.6 produced by the decoder 9 is made "0" the content of a specific register of the register file 14.1 selected by the selection signal 14.7 is sent to the input port 120 of the arithmetic logic unit 12.

The data writing operation of the program counter 15 will now be described. More particularly, when the part 802.2 of the micro-instruction register 8 designates the program counter 15 to act as a destination register, the decoder 9 changes the state of the write enabling circuit 15.3 to a register 15.1 to "1", and the data calculated by the arithmetic logic unit 12 is sent to an input of the register 15.1 over the internal bus line 13. An AND gate circuit 15.2 is enabled by a clock pulse 15.6 and the write enabling signal 15.3 from the decoder 9 to produce a write pulse which is applied to the register 15.1 to write data thereinto.

The read out operation from the program counter 15 will now be described. Thus, the part 802.1 of the micro-instruction register 8 designates the program counter 15 to act as the source register. When the read enabling signal 15.4 produced by decoder 9 is changed to "0" the content of the register 15.1 is sent to the input port 120 of the arithmetic logic unit 12.

While the reading and writing operations of the general register 12 and the program counter 15 have been described, it should be understood that enabling signals similar to write enabling signals 14.5 and 15.3 and read enabling signals 14.6 and 15.4 are also sent to other registers, for example A register 18 and B decoder 9 from the decoder 9.

The part 803 of micro-instruction register 8 controls branching at a micro-program level. The branching mask bits of part 803 is compared with the content of condition code register 11 by a branching condition judging logic 10 and when a coincidence is obtained a branch address designated by part 803 of the micro-instruction register is sent to MPAR 5 and the branch address is latched therein. The part 804 of micro-instruction register 8 is connected to a decoder 33 for controlling a phase control logic 31, a memory control logic 32, flag register 30 and push down stack 16. The codes stored in this part 804 are designated by the extension of the mnemonic code of the micro-instruction. These codes include a phase shift request (PHASE), a memory read out request (MR), a latch request (SF) of the flag register, a write request (PUSH) and a read request (POP) for the push down stack. The code of part 804 of the micro-instruction register 8 is shown in the following Table III.

TABLE III

| Bit position | Symbol | Function |
|---|---|---|
| 24 | MR | Memory read out request for the memory control logic 32. |
| 25 | MW | Removing write request for the memory control logic 32. |
| 26 | PUSH/POP | Write request (PUSH) or read request for the push down stack 16. |
| 27 | PHASE | Place shift request of the phase control logic 31. |
| 28 | SF | Latch request of the flag register 30 |
| 29 | — | |

When the value of each bits of the extension, the part 804 of the micro-instruction register 8 is "1", the function described above is enabled and respective control signals are sent to respective parts. The codes in part 804 are decoded by decoder 33 into control signals. The memory read out request MR sends a start signal to memory control logic 32 for producing a control signal to read out the main memory device. Thus, in response to the start signal, memory control logic 32 sends a read out pulse to main memory device 37 thus reading the same. Consequently, the content of an address of the main memory device represented by the value of memory address register 22 is read out and applied to memory bus line 1 extending between instruction register 2 and memory data register 20. Which one of the registers should latch the value of memory bus line 1 is controlled by phase control logic 31. Where the phase control logic is at phase 0, the data latch terminal of instruction register 2 is enabled, whereas when the phase control logic is at phase 1 or phase 2, the data latch terminal of memory data register 20 is enabled.

When the code is a latch request (SF), the output of decoder 33 enables the data latch terminal of flag register 30 to latch therein the content of condition code register 11 without any change. When the code is a PHASE request, decoder 33 sends a phase shift control signal to phase control logic 31. The phase control logic 31 can assume either one of three states of phase 0, phase 1 and phase 2, but when it is supplied with a phase shift signal it shifts the present phase to the next phase. The next phase is determined by the state of the present phase and the output of decoder 4.

When the code is a PUSH request, decoder 33 sends a control signal to push down stack 16 for writing therein the data on internal bus line 13, whereas when the code is a POP request, the decoder sends a control signal to the push down stack to read out one of its contents and apply it to the internal bus line 35. In each case, part 802 of the micro-instruction register 8 should designate push down stack 16. Under this condition the push down stack is in an input enabling or output enabling state.

As is well known in the art, the push down stack is constructed as follows. Some times it is called a last-in-first-out stack. Suppose a cylindrical coin holder with a spring in the bottom. Whenever a coin is inserted into the top, coins already stored in the holder are pushed down (predescribed as PUSH), and the coins can be taken out only from the top. The push down stack comprises a stack of registers and data is stored and read out only in the uppermost register. When no longer needed the top register is deleted or "popped up" (POP).

The part 202 of instruction 2 is utilized to designate one of the register stages of general register 14 in response to an instruction so as to use the designated register stage, and in the case of a truth/false check instruction the part 202 is used to give a mask value for checking flag register (FLR) 30 which shows the result of the arithmetic operation of the arithmetic logic unit 12. The truth/false check instructions can be classified into R-R type and R-S type. The truth/false check instruction of the R-R type branches (or jumps) to an address represented by the content of the general register 14, A register 18, B register 19 or push down stack 16 selected by the part 203 of the instruction register 2, whereas the truth/false check instruction of the R-S type branches, a branch address to be read out into the memory data register stored in a memory address of the main memory device next to an address thereof storing this instruction.

The procedure executed by the micro-program executed by these instructions will not be described with reference to FIG. 9.

(1) The value of part 202 of instruction register 2 containing the mask value for the truth/false check is temporarily stored in one of the working register 17 via arithmetic logic unit 12 and internal bus line 13.

(2) The content of the general register 14 designated by the part 203 of instruction register 2 is temporarily stored in one of the working register 17 via arithmetic logic circuit 12 and internal bus line 13.

(3) The arithmetic logic unit 12 operates a logical product of the value of flag register 30 including a flag which performs the check and the value held in step (1) mentioned above. The flag determined by this arithmetic operation is set in condition code register 11, the value of the flag becoming unique whether the condition holds or not.

(4) To check whether the condition of truth or false has been established or not, the value of the condition code register 11 and the mask value of the part 803 of the micro-instruction register 8 are applied to branching condition judging logic 10. When the condition holds, the step is advanced to step 5 described below whereas when the condition is not held to step 6 below. The operation of the condition lodging logic 10 will be described later.

(5) When the truth condition given by the truth/false check instruction holds, the address to be branched is given to program counter 15. This address is loaded from working register 17 held in step (2).

(6) The value of program counter 15 is incremented by one so as to set the count of the program counter to that of the address of the next instruction succeeding to the truth/false check instruction.

Included in the truth/false check instructions are the branching instructions originating from A register and B register shown in the drawing and the branching instructions from the general register 14 utilized in a conventional computer. The branching instruction according to this invention will be described later.

The procedure of processing the truth/false check instruction of the R-S type truth/false check instruction will now be described with reference to FIG. 9. However, this type of instruction is not included in the scope of this invention. (1) The count of the program counter 15 is increased by one to change it to a new count corresponding to an address of the main memory device 37 storing the branching address. Further a memory read request is made to the main memory device to read out the branching address. (2) Same as step (1) described in connection with the R-R type truth/false check instruction. (3) At step (1), memory read out request is made for temporarily store in one of the working register 17 a branching address which has been stored in the memory data register 20. (4) Same as step (3) described in connection with the R-R type truth/false check instruction. (5) Same as step (4) described in connection with the R-R truth/false check instruction. When a condition holds the step is advanced to step (7) whereas when the condition is not hold the step is advanced to step (7). (6) Same as step (5) described in connection with the R-R type truth/false check instruction. (7) Same as step (6) described in connection with the R-R type truth/false check instruction.

The part 203 is used to designate one of the stages of general register 14.

After execution of a micro-instruction having an address loaded in MPAR 5 from decoder 4, the contents of MPAR 5 are incremented by one by the action of an incrementer 6 whereby the micro-instructions of the succeeding addresses are consecutively applied to micro-instruction register 8. Where the micro-instruction loaded in MIR 8 comprises a branch operation code, and where the establishment of the branch condition is found by a branching condition judging logic 10, a branch address designated by part 803 is loaded in MPAR 5 whereby it enables branching of the micro-program to the micro-construction having an address designated by part 803.

The judging condition establishment is made by comparing respective bits of CCR 11 with respective bits of the mask value of an instruction loaded in part 803 of the micro-instruction register 8. Respective bits of CCR 11 represent the states of the result of the arithmetic operation, and each bit comprises flags of four bits which become a binary 1 when the states of carry, overflow, negative and all zero occur. Let us denote the values of these flags by C, V, N and Z as shown in FIG. 7. The part 3 of micro-instruction register 8 comprises a part 803.1 that designates the branch address and a part 803.2 which is a mask bit of a branching condition. Respective bits of part 803.2 corresponding to respective bits of condition code register 11 are represented by M(0), M(1), M(2) and M(3), respectively. When the value of the following function F becomes "1", the part 101 of the branching condition judging logic 10 produces a signal for applying the value of part 803.1 to the MAR 5 through a switch, not shown.

$$F = \{M(0) \wedge C\} \vee \{M(1) \wedge V\} \vee \{M(2) \wedge N\} \vee \{M(3) \wedge Z\}$$

When the value of function F determined by part 101 is "0", part 101 produces a signal that applies the output of the incrementer 6 to an input of MPAR 5. The branching of the microinstruction is made by judging with the part 101 of the branching condition judging logic 10 whether the value of part 803.2 which constitutes one of the branching conditions and the branching condition condition of the condition code register 11 hold or not. When the branching condition holds and branching is effected, a branch address of part 803.1 is loaded in the MPAR 5.

When the branching condition does not hold the content of 20 MPAR 5 is incremented by "1" by the incrementer 6 and the incremented value is loaded again in MPAR 5.

The arithmetic logic unit 12 is constructed to receive data through two input ports 120 and 121 and to produce its result of arithmetic operation through an output port 122. The input port 120 is connected to part 202 of instruction register 2, flag register (FLR) 30, general register 14, program counter 15 and internal bus line 35 leading to memory data register 20 whereas input port 121 is connected to working register 17. The output port 122 is connected to internal bus line 13 to which are connected aforementioned memory address register (MAR) 22 for effecting read and write of the main memory device 37, memory data register (MDR) 20, program counter 15, general register 14, working register 17, A register 18, B register 19 and push down stack 16.

In the central processing system shown in FIG. 1, the instructions contained in the main memory device are executed in the following manner.

The central processing unit provides such instructions as are provided in commercially available computing devices. In addition to conventional instructions as are available in conventional computing devices, the central processing unit provides additional instructions, which we call herein "#-instructions".

By using one or a plurality of #-instructions, it becomes easy to read a program written with assembler languages of the central processing unit, and programmers are encouraged in writing their program in instructing methodology.

A first instruction of the #-instruction designates three entry addresses and places them into the first register, the second register and push down stack respectively, second and third instruction of the #-instruction check a condition designated, select either the first register, the second register then moves the content of the selected register into the program counter 15. A fourth instruction of the #-instruction pops up the push down stack and moves the popped up output into the program counter 15. A fifth instruction of the #-instruction pops up the push down stack and discards the popped up output.

At first, a control signal is applied to program counter 15, MAR 22, etc. from decoder 9 for performing the following operations.

(1) The content of the program counter 15 is loaded in MAR 22 via arithmetic logic unit 12 and internal bus line 13. As a consequence, the output of MAR 22 is sent to the main memory device via a memory address bus line 21 for designating the address of an instruction to be read out from the main memory device.

(2) "Memory read" is designated to the main memory device and the read out data is loaded in the instruction register 2. The designation of the "memory read" is effected by a control signal produced by the part 804 of MIR 8.

(3) The content of program counter 15 is incremented by one by the arithmetic logic unit 12 and the result of incrementation is reloaded in program counter 15 through internal bus line 13.

As a result of the operations described above, the content of the program counter 15 is incremented by one and an instruction to be executed is applied to instruction register 2.

When a new instruction is loaded in instruction register 2, its operation code part 201 is converted into a first address of a micro-routine by means of decoder 4, and the first address is loaded in MPAR 5. As above described, MPAR 5 performs an address designation and MPM 7 produces a micro-instruction corresponding to the designated address. In response to this micro-instruction, MIR 8 sends a control signal to respective registers, arithmetic logic unit 12 and gate circuits, not shown. Upon completion of the execution of one micro-instruction, the content of MPAR 5 is incremented by one by incrementer 6 or an address to which branching is made is loaded by the control of the branching condition judging logic 10. In this way each instruction is executed by a corresponding micro-instruction group comprising several steps. The last micro-instruction of the micro-instruction group comprises a branching code adapted to return the control to the instruction fetch micro-program, and when the next micro-instruction is fetched similar processing is effected.

FIG. 2 shows the format of a multiple ML instruction in which part 23 designates an operation code, and parts 24, 25 and 26 respectively contain address pointers of the three entry addresses of the first, the second, or the third blocks of the program to which branchings are to be made.

FIG. 3 shows the format of a branch when a truth condition is established (BTC instruction) and the format of a branch when a false condition is established (BFC instruction), and in which part 27 designates an operation code and part 28 a mask value for truth or false condition check.

FIG. 4 shows the format of an END instruction and a LOOP OUT instruction wherein part 29 designates an operation code.

The representation in assembly language of each instruction and the operation thereof are as follows. In the following description, the values stored in registers are shown by the names of the registers in parenthesis and arrows show that the values on the righthand sides are loaded in registers on the lefthand side. Furthermore, AR represents A register, BR B register, STK push down stack, and PC the program counter.

| | | |
|---|---|---|
| (1) | ML instruction | |
| | assembler representation | ML A, B, C |
| | operation : | AR ← A |
| | | BR ← B |
| | | push down C to STK |
| | | PC ← (PC) + 3 |
| (2) | Truth/false check instruction | |
| | (2-1) BTC instruction | |
| | assembler representation BTC | M(0),M(1),M(2),M(3) |
| | operation : | when F = 1 PC ← (AR) |
| | | when F = 0 PC ← (BR) |
| | | wherein F represents a function of the condition check described above. |
| | (2-2) BFC instruction | |
| | assembler representation BFC | M(0),M(1),M(2),M(3) |
| | operation : | when F = 1 PC ← (BR) |
| | | when F = 0 PC ← (AR) |
| (3) | END instruction | |
| | assembler representation | END |
| | operation : | STK is popped up and its value is loaded in PC. |
| (4) | LOOP OUT instruction | |
| | assembler representation | LOOP OUT |
| | operation : | STK is popped up but its value is not loaded in any counter. |

The details of these instructions are as follows:

(1) ML instruction (i) The content of program counter 15 is loaded in memory address register 22 via arithmetic logic unit 12 and internal bus line 13. Consequently, the memory address which stores data A of the format shown in FIG. 2 is loaded in memory address register 22.

(ii) In accordance with the memory read instruction, data A is read out, via memory bus line 1 and memory data register 20, to arithmetic logic unit 12 and then loaded in A register 18.

(iii) The content of program counter 15 is loaded in arithmetic logic unit 12 to be incremented by one and the result is loaded again in program counter 15.

(iv) The content of program counter 15 is loaded in memory address register 22 by the same micro-instruction as in step (i). Consequently, the content of register 22 is equal to the address value of a location which is storing data B.

(v) By the same operation as in step (ii) a "memory read" is effected so as to load data B in B register 19.

(vi) By the same micro-instruction as in step (iii) the content of program counter 15 is incremented by one.

(vii) By the same micro-instruction as in step (i) the content of program counter 15 is loaded in address memory register 22. As a result, the content thereof is equal to the address value of the location which is storing data C.

(viii) "Memory read" is effected and data C is pushed down in push down stack 16 via memory data register 20 and internal bus line 13.

(ix) By the same micro-instruction as in step (iii) the content of the program counter 15 is incremented by one.

(x) For the purpose of fetching, the next instruction, branching is made.

(2-1) BTC instruction (i) An address to which branching has been made is loaded in branching address designation part 803 of MIR 8 and when F=1, the branching is made to step (iv) whereas when F=0 step is advanced consecutively to step (ii).

(ii) The content of B register 19 is loaded in program counter 15.

(iii) Branching is made to the instruction fetching program.

(iv) The content of A register 16 is loaded in program counter 15.

(v) Branching is made to the instruction fetch program.

(2-2) BFC instruction

In the BFC instruction executing micro-program, steps (ii) and (iv) of (2-1) are interchanged.

(3) END instruction (i) The push down stack 16 is popped up and the popped up value is loaded in program counter 15.

(ii) Branching is made to the instruction fetch program.

(4) LOOP OUT instruction (i) The push down stack 16 is popped up but its content is not used.

(ii) Branching is made to the instruction fetch program.

By using these instructions, a control can be freed from a looped block. It is said that structured programming is made readily by combining the following three types of programs.

| (a) | Sequential processing |
| (b) | IF ~ THEN ~ ELSE ~ |
| (c) | DO WHILE ~ or DO UNTIL ~ |

The structured programs can be expressed by three fundamental forms as shown in FIGS. 5a, 5b and 5c. FIG. 5a shows a sequential processing in which after completion of a block $X_1$, the next block $Y_1$ is executed. In the case of FIG. 5b, when a condition is satisfied as a result of a condition judgement, one block, for example, block $X_2$ is executed whereas when the condition is not satisfied the other block $Y_2$ is executed. Irrespective of the block executed a succeeding block is executed. These processes are expressed by "IF—THEN— ELSE" described above. FIG. 5c shows a structured program having a repetition structure which continuously processes block $Y_3$ until a condition is established or while the condition is being established. This process is expressed by "DO WHILE" and "DO UNTIL" already mentioned. FIG. 5d is a modification of FIG. 5c in which judgement is made before the processing of block $Y_3$.

Thus, it is possible to express all programs by the three fundamental forms described above, and any block has a block structure expressed by one of these fundamental forms. An instruction is a minimum unit of a block. Let us consider how to represent types (b), (c) and (d) by machine words utilized in the conventional operation and processing apparatus by the aid of the following concrete problems.

| (i) | If X > 0<br>Then SUM = SUM + X<br>ELSE I = I + 1;<br>END; |
| (ii) | DO WHILE I ≦ 5;<br>X(I) = X(I) + 1;<br>I = I + 1;<br>END; |
| (iii) | DO UNTIL I = 5;<br>X(I) = X(I) + 1;<br>I = I + 1<br>END; |

According to the conventional system a program of the machine words corresponding to these problems are as follows wherein one line divisioned by a symbol (;) corresponds to one machine word.

| address | instruction | |
|---|---|---|
| (i) i | load X in the accumulator; | |
| i+1 | test if <accumulator> is plus, if true, then go to next address, ELSE go to address F; | |
| i+2 | ......; | ⎫ a block for executing |
| i+3 | ......; | ⎬ SUM = SUM + X |
| . | | ⎭ |
| F−1 | go to NXT; | |
| F | ......; | ⎫ a block for executing |
| $F_1$ | ......; | ⎬ I = I + 1 |
| . | | |
| NXT | ......; | } next block |

Remarks: The symbol <accumulator> represents the working register 17 in this case.

| address | instruction | |
|---|---|---|
| (ii) i | load I in the accumulator; | |
| i+1 | <accumulator> is subtracted by 5; | |
| i+2 | TEST, if <accumulator> is minus, if TRUE, then go to NXT, ELSE go to next address; | |
| i+3 | ......; | ⎫ a block for |
| i+4 | ......; | ⎬ executing |
| . | | ⎬ X(I) = X(I) + 1; |
| NXT-1 | go to address i; | ⎭ I = I + 1; |
| NXT | ......; | |
| . | | } next block |

| address | instruction | |
|---|---|---|
| (iii) i | ......; | a block for executing |
| i+1 | ......; | X(I) = X(I) + 1; |

-continued

| address | instruction | |
|---------|-------------|---|
| i+2 | .....; | ⎫ |
| . | | ⎬ I = I + 1; |
| . | | ⎭ |
| j | load I in the accumulator | |
| j+1 | <accumulator> is subtracted by 5; | |
| j+2 | TEST if <accumulator> is zero, then go to next address, ELSE go to address i; | |
| j+3 | .....; | ⎫ |
| . | | ⎬ next block |
| . | .....; | ⎭ |

The programs described above can be rewritten in the machine languages by using ML, BTC, BFC, END and LOOP OUT instructions so as to correspond to the embodiment shown in FIG. 1.

| address | instruction | |
|---------|-------------|---|
| (i) | i | load X in the accumulator |
| | i+1 | ML A, B, C; (newly devised instructions) |
| | i+2 | BFC 0, 0, 1, 1; (newly devised instructions) |
| | A | ......; ⎫ a block for executing |
| | A+1 | ......; ⎬ |
| | . | ......; ⎭ SUM = SUM + X |
| | | END (newly devised instruction) |
| | B | ......; ⎫ a block for executing |
| | B+1 | ......; ⎬ |
| | . | ......; ⎭ I = I + 1 |
| | | END (newly devised instruction) |
| | C | ......; ⎫ next block |
| | . | ⎭ |

| address | instruction | |
|---------|-------------|---|
| (ii) | C−1 | set I = 1 |
| | C | load I in the accumulator |
| | C+1 | <accumulator> is subtracted by 5; |
| | C+2 | ML A, B, C (newly devised instructions) |
| | C+3 | BFC 0, 0, 1, 1; |
| | B | ......; ⎫ a block for executing |
| | B+1 | ......; ⎬ X(I) = X(I) + 1; |
| | . | ......; ⎭ I = I + 1; |
| | | END; (newly devised instruction) |
| | A | LOOP OUT; (newly devised instruction) |
| | A+1 | ......; ⎫ next block |
| | . | ⎭ |

| address | instruction | |
|---------|-------------|---|
| (iii) | C−1 | set I = 1 |
| | C | ......; ⎫ a block for executing |
| | C+1 | ......; ⎬ X(I) = X(I) + 1; |
| | C+2 | ......; ⎭ I = I + 1; |
| | . | | |
| | B−4 | load I in the accumulator |
| | B−3 | <accumulator> is subtracted by 5; |
| | B−2 | ML A, B, C; (newly devised instruction) |
| | B−1 | BFC 0, 0, 1, 1; (newly devised instruction) |
| | B | END; (newly devised instruction) |
| | A | LOOP OUT; (newly devised instruction) |
| | A+1 | ......; |

-continued

| address | instruction | |
|---------|-------------|---|
| . | | ⎫ next block |
| . | .....; | ⎭ |

As can be clearly understood from these programs, the programs prepared to correspond to the central processing unit of this invention have the following advantages.

(1) It is possible to visibly understand a program designated by $X_1$, $X_2$ or $Y_1$, $Y_2$, $Y_3$ in FIGS. 5a–5d as an independent block having one entry and one exit. In FIGS. 5a, 5b and 5c, the entry address of block $X_1$ or $X_2$ is A and the entry address of block $Y_1$, $Y_2$ or $Y_3$ is B so that EXIT appears always at the exit, thus facilitating preparation and reading of the program. Accordingly, it is possible to prepare blocks of the program which is basic concept of the structured program.

(2) As it is possible to prohibit use of a "GO TO" instruction, it is possible to decrease indisciplined programs liable to accompany errors.

(3) As it is possible to include IF—THEN—ELSE—, DO WHILE— or DO UNTIL— in block $X_1$, $X_2$ or $Y_1$, $Y_2$, $Y_3$ shown in FIGS. 5a–5d, it is possible to structurize the program.

(4) As the entry address C of a block is stored in the push down stack, it is possible to include smaller blocks in blocks $X_1$, $X_2$ or $Y_1$, $Y_2$, $Y_3$ respectively and to form much smaller blocks in the smaller blocks.

Although in the embodiment shown in FIG. 1, the control signals and instructions for the arithmetic logic unit, various registers and the push down stack are produced by micro-programs, it is also possible to produce such control signals and instructions with a wired logic. It is possible to substitute some of the registers in the general register with A and B registers without actually providing them. By providing a stack pointer for the central processing unit, a portion of the main memory device can be used as the push down stack. Such modified construction can also attain the same object as the embodiment shown in FIG. 1.

One example of forming instructions BTC, BFC, END, LOOP OUT and ML described above by computer logic circuits will now be described. Since each of the instructions BTC, BFC, END and LOOP OUT does not accompany input and output to and from memory devices they are called "R-R type" (register to register type) whereas as the instruction ML accompanies input and output to and from a memory device it is called R-S type (register to storage type).

All of these instructions are executed by micro-programs. Each program is executed by a fetch cycle in which the content of a designated address of the main memory device is read out into instruction register 2 or MDR 20 by MAR 22 and an execution cycle in which the read out content is executed by a succeeding micro-program.

Figure 6:
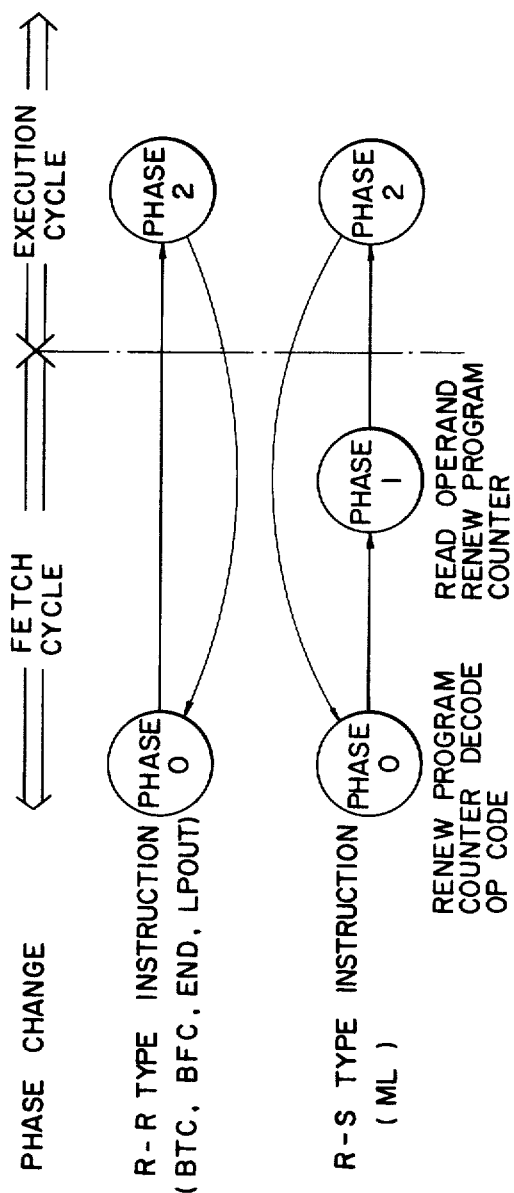
FIG. 6 is a graph showing the manner of phase change.

In a R-R type instruction, each of the fetch cycle and execution cycle comprises a single phase whereas in a R-S type instruction, the fetch cycle comprises two phases. These states are shown in FIG. 6. As shown, there are three phases, viz. PHASE 0, PHASE 1 and PHASE 2 which operate as follows.

PHASE 0

In this phase, the value of program counter 15 is incremented by one by incrementer 6 to prepare for the next reading of the memory device. The data requesting reading of the memory device in accordance with the last micro-instruction of PHASE 2 which has already been executed is latched in the instruction register 2 in PHASE 0. The OP code part 201 of this register causes phase control logic 31 to determine the next phase via decoder 4. When the instruction is determined to be R-R type the next phase is changed to PHASE 2 for branching to the first address that executes the output of decoder 4. When the instruction is of the R-S type, the next phase is changed to PHASE 1 thereby branching to a specific address for the R-S type instruction.

PHASE 1

In this phase, the operand of a R-S type instruction is read. Generally, since a machine instruction of the R-S type has only one operand, only one operand read out operation is sufficient for PHASE 1. Although the ML instruction includes three operands, in PHASE 1, one operand is read, while remaining two operands are read in PHASE 2. As above described, PHASE 1 is used commonly for processing all machine instructions. The output of program counter 15 is incremented by one by arithmetic logic unit 12 to prepare for reading the next content of the memory device. The next phase is changed to PHASE 2 thus branching to the first address that executes the decoder output.

PHASE 2

In this phase, processings specific to respective machine instructions are made. Upon completion of a processing in PHASE 2, the execution of the next machine instruction is commenced so that read out of the next machine instruction is made thus returning to PHASE 0.

Usually, the micro-instructions are executed consecutively. For the purpose of increasing the instruction execution speed, while one micro-instruction is being executed, a request is made for reading the already known next instruction thus apparently reducing to zero the access time to micro-program memory device. When the branching is made by a branching micro-instruction, the instruction is transferred to that for an address which is different from the address which has already requested reading. At this time, the branching condition of the time (called a machine cycle) which is necessary to execute one micro-instruction is determined by the branching condition judging logic 10 whereby the value of the part 803 of micro-instruction register 8 is set in micro-program address register 5 as a next execution address thus making it impossible to read the micro-instruction of that address within one machine cycle. In the operation described above, two machine cycles are allocated only when the branching is made by a micro-instruction branching.

Since the phase change is a type of branching, it requires two machine cycles. Consequently, to effect a phase change, a phase change request is sent to phase control logic 13 via decoder 33 by a micro-instruction that precedes a micro-instruction that effects phase change. In response to this request signal, the phase control logic switches the input to micro-program address register 5 from incrementer 6 to decoder 4, thus latching the input at a time when an instruction succeeding to an instruction for requesting phase change is sent.

Respective instructions BTC, BFC, END, LOOP OUT and ML are executed by micro-instructions each consisting of an OP code, an operand and an extension. In some cases, the operand comprises first and second operands. The construction of these instructions and the symbols included therein are as follows.

| Operation | |
|---|---|
| INCR | (increment) |
| L | (load) load the second operand in the first operand |
| N | (obtain a logical product of the first and second operands and store the product in the first operand) |
| B | (conditional branch) judge the branching condition and branch to specific micro-instruction address designated by first operand |

| Operand | |
|---|---|
| PC | (program counter 15) |
| WR2,WR3 | (working register 17) in addition to these there are WR0 and WR1. |
| AR | (A register 18) |
| BR | (B register 19) |
| STK | (push down stack 16) |
| MDR | (memory data register 20) |
| MAR | (memory address register 22) |
| IR4 | (mask bit 202 of instruction register 2) |
| FLR | (flag register 30) |
| YS | (general register for a data source showing one of the register stages of the general register 14) |

| Extension | |
|---|---|
| PHASE | (phase change) |
| MR | (memory read) |
| PUSH | (storing in the push down stack 16) |
| POP | (taking out from the push down stack 16) |
| SF | (set a flag which transfers the content of condition code register 11 to flag register 30) |

The followings are the list of the micro-programs necessary to execute instructions BTC, BFC, END, LOOP OUT and ML.

For an ML instruction, the micro-program of the part labelled ML of PHASE 0, PHASE 1 and PHASE 2 is executed. By the execution of this micro-program, various elements shown in FIG. 1 are controlled for performing operations necessary to execute the ML instruction.

For the other instruction, the micro-program of the parts labelled with symbols corresponding to the titles of the instructions of PHASE 0 and PHASE 2 (for example, in the case of a BTC instruction, a part labelled with BTC) whereby various elements shown in FIG. 1 are controlled so as to execute operations necessary to execute respective instructions.

| PHASE 0 | | | |
|---|---|---|---|
| 1. PHASE 0 | INCR | PC, PHASE | increment program counter |
| 2. | L | WR2, YS | |

-continued

| PHASE 1 | | - R-S type - | | |
|---|---|---|---|---|
| 3. PHASE 1 | | L | MAR, PC, MR | |
| 4. | | INCR | PC, PHASE | increment program counter |
| 5. | | L | WR3, WR3 | no operation |
| PHASE 2 | | - R-S type - | | |

| ML | L | AR, MDR | load first operand (branch-1 appears) | |
| --- | --- | --- | --- | --- |
| | L | MAR, PC, MR | | |
| | INCR | PC | | |
| | L | WR3, WR3 | no operation | |
| | L | BR, MDR | load second operand (branch-1 appears) | |
| | L | MAR, PC, MR | | |
| | L | WR3,WR3 | no operation | |
| | INCR | PC | set PC to next instruction | |
| | L | STK,MDR,PUSH | load third operand (block next address) | |
| | L | MAR,PC,MR + PHASE | phase change and go to next instruction | |
| | L | WR3,WR3 | no operation | |

| BTC | | L | WR3,IR4 | load mask bit |
| --- | --- | --- | --- | --- |
| | | N | WR3,FLR | check branch condition |
| | BTCAR | B | Z,BFCBR | |
| | | L | MAR,AR,MR + PHASE | phase change |
| | | L | PC,AR | set (AR) to (PC) |

| BFC | | L | WR3,IR4 | load mask bit |
| --- | --- | --- | --- | --- |
| | | N | WR3,FLR | check branch condition |
| | | B | Z,BTCAR | |
| | BFCBR | L | MAR,BR, MR + PHASE | phase change |
| | | L | PC, BR | set (BR) to (PC) |

| END | L | PC,STK,POP | pop up R-R type |
| --- | --- | --- | --- |
| | L | MAR,PC, MR + PHASE | |
| | L | WR3,WR3 | no operation |

| LOOP OUT | L | WR3,STK,POP | pop up R-R type |
| --- | --- | --- | --- |
| | L | MAR,PC,MR + PHASE | |
| | L | WR3,WR3 | no operation |

We claim:

1. A computer for directly executing a program including a plurality of structured blocks, comprising:
a main memory device for storing said program;
a program counter for designating an address of an instruction to be executed;
a first register for storing an entry address of a first block of said program;
a second register for storing an entry address of a second block of said program;
a push down stack for storing an entry address of a third block of said program;
means for causing said program counter to designate a predetermined address for reading an instruction from said main memory device thereby reading out from said main memory device said entry address of an instruction of the contents of either one of said first, second and third blocks of the program;
means for causing the storage of said read out entry address in said first and second registers and in said push down stack respectively;
means for unloading the content of the first register, second register, or popping up said push down stack and for storing the content of one of said first register, second register, or push down stack in said program counter; and
means for producing an instruction for popping up said push down stack and for discarding an entry address derived therefrom in response to a predetermined instruction in one of said blocks.

2. The computer according to claim 1 wherein said program counter designates a predetermined address for reading out first, second and third entry addresses of blocks of a program from said main memory device so as to store the first entry address in said first register, the second entry address in said second register, the third entry address in said push down stack, and wherein the result of an arithmetic operation of an arithmetic logic unit selects either one of said first and second registers for applying the content thereof to said program counter.

3. The computer according to claim 2 wherein said third entry address comprises an address of an instruction to be executed after a block of a program has been executed and said entry address is stored in said push down stack.

4. The computer according to claim 3 which further comprises means for popping up said entry address stored in said push down stack after a plurality of said instructions in one block have been executed and for storing the popped up entry address in said program counter.

5. The computer according to claim 3 which further comprises means for popping up and discarding said entry address stored in said push down stack when said entry address becomes invalid while a plurality of said instructions in one block are being executed and for storing in said program counter an address of an instruction succeeding a instruction containing the last program of said block.

6. A computer for directly executing a program including a plurality of structured blocks, comprising:
- a main memory device for storing programs each constituted by a plurality of structured blocks;
- an instruction register for storing an instruction derived out from said main memory device and said instruction including an operation code part;
- a program counter for designating an address of an instruction to be loaded in said instruction register;
- a decoder responsive to said operation code part for producing a first address of a micro-program for executing said instruction;
- a micro-program memory device;
- a micro-program address register for latching said first address to designate said first address thereof in said micro-program memory device;
- a micro-instruction register for holding the content of said micro-program memory device corresponding to said address;
- a working register;
- an arithmetic logic unit controlled by the outputs of said micro-instruction register;
- a memory data register connected to the output of said arithmetic logic unit for writing and reading data into said main memory device;
- a memory address register connected to the output of said arithmetic logic unit for designating an address of an instruction to be read out from said main memory device;
- a first register connected to the output of said arithmetic logic unit for storing an entry address of a first block of said program;
- a second register connected to the output of said arithmetic logic unit for storing an entry address of a second block of said program;
- a push down stack connected to the output of said arithmetic logic unit for storing an entry address of a third block of said program; and
- means for supplying the output of said arithmetic logic unit to said working register and said program counter respectively for temporarily storing the output.

7. The computer according to claim 2 which further comprises means for sequentially incrementing by one the contents of said micro-program address register each time a micro-instruction of an address loaded in said micro-program address register is executed thereby sequentially executing micro-instructions of consecutive addresses.

8. The computer according to claim 6 wherein said micro-instruction register includes a first part containing any one of an INCREMENT code for causing said arithmetic logic unit input to increment by one, a LOAD code for causing said arithmetic logic unit to transmit its input to the output thereof without any mathematical operation, a LOGICAL PRODUCT code for causing said arithmetic logic unit to form a product of a plurality of inputs, or a BRANCH code for causing said arithmetic logic unit not to operate; a second part containing a code which designates registers to be loaded into said arithmetic logic unit, a third part containing a code which controls branching of a micro-program level, and a fourth part containing a code for controlling an additional decoder for providing control signals to said push down stack.

9. The computer according to claim 6 which further comprises a condition code register responsive to an output of said arithmetic logic unit and a branching condition judging logic circuit connected to receive the outputs of said condition code register and a third part of said micro-instruction register whereby a branched address is loaded into said micro-program address register in response to a signal from said logic circuit.

* * * * *